United States Patent [19]

Poley

[11] 4,157,189
[45] Jun. 5, 1979

[54] TRAILER HITCH BRACKET

[76] Inventor: Roger G. Poley, Rte. 3, Howe, Ind. 46746

[21] Appl. No.: 837,085

[22] Filed: Sep. 28, 1977

[51] Int. Cl.$^2$ ............................................. B60D 1/06
[52] U.S. Cl. ................................. 280/490 R; 280/500
[58] Field of Search ............... 280/490 R, 490 A, 500, 280/511, 457; 293/69 R

[56] References Cited

U.S. PATENT DOCUMENTS

| | | | |
|---|---|---|---|
| 2,347,081 | 4/1944 | Caton | 280/490 R |
| 3,132,878 | 5/1964 | De Puydt et al. | 280/457 |
| 3,806,161 | 4/1974 | Pollart | 280/500 |

FOREIGN PATENT DOCUMENTS 976578  10/1975  Canada ................................. 280/490

*Primary Examiner*—John A. Pekar
*Attorney, Agent, or Firm*—Marmaduke A. Hobbs

[57] ABSTRACT

A trailer hitch bracket for mounting on the rear bumper of a pickup truck, having a first fixture rigidly attached to the bumper by a forwardly extending plate bolted to the bumper, and a second fixture supported by the first fixture and being adjustable vertically relative to the first fixture for supporting a hitch ball. The first fixture has a downwardly extending plate attached to the rear edge of the forwardly extending plate, and the second fixture has a vertically extending member releasably secured to the downwardly extending plate of the first fixture and supports a rearwardly extending member to which the hitch ball is attached. The two fixtures are preferably secured together by bolts, and a plurality of holes are provided for adjusting the second fixture up or down as required to levelize the trailer with respect to the pickup truck. A chain securing member is provided on each side of the second fixture for attaching chains interconnecting the two vehicles, in one embodiment the securing member being a transversely disposed bar attached to the rearwardly extending member and having holes in the outer ends thereof for receiving the ends of the chains.

3 Claims, 8 Drawing Figures

U.S. Patent  Jun. 5, 1979  Sheet 1 of 2  4,157,189
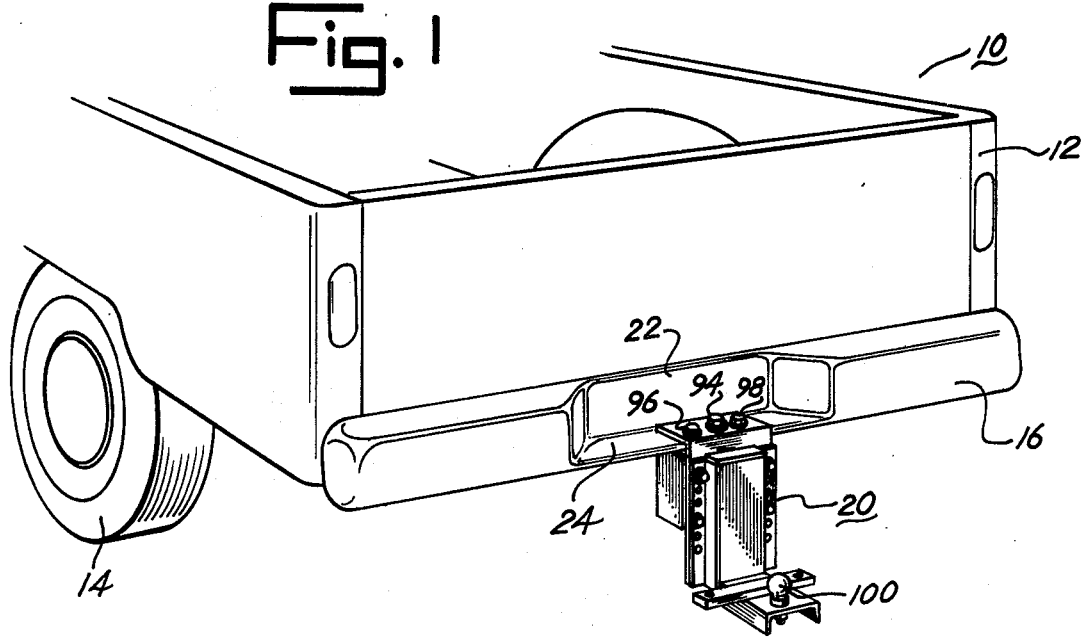
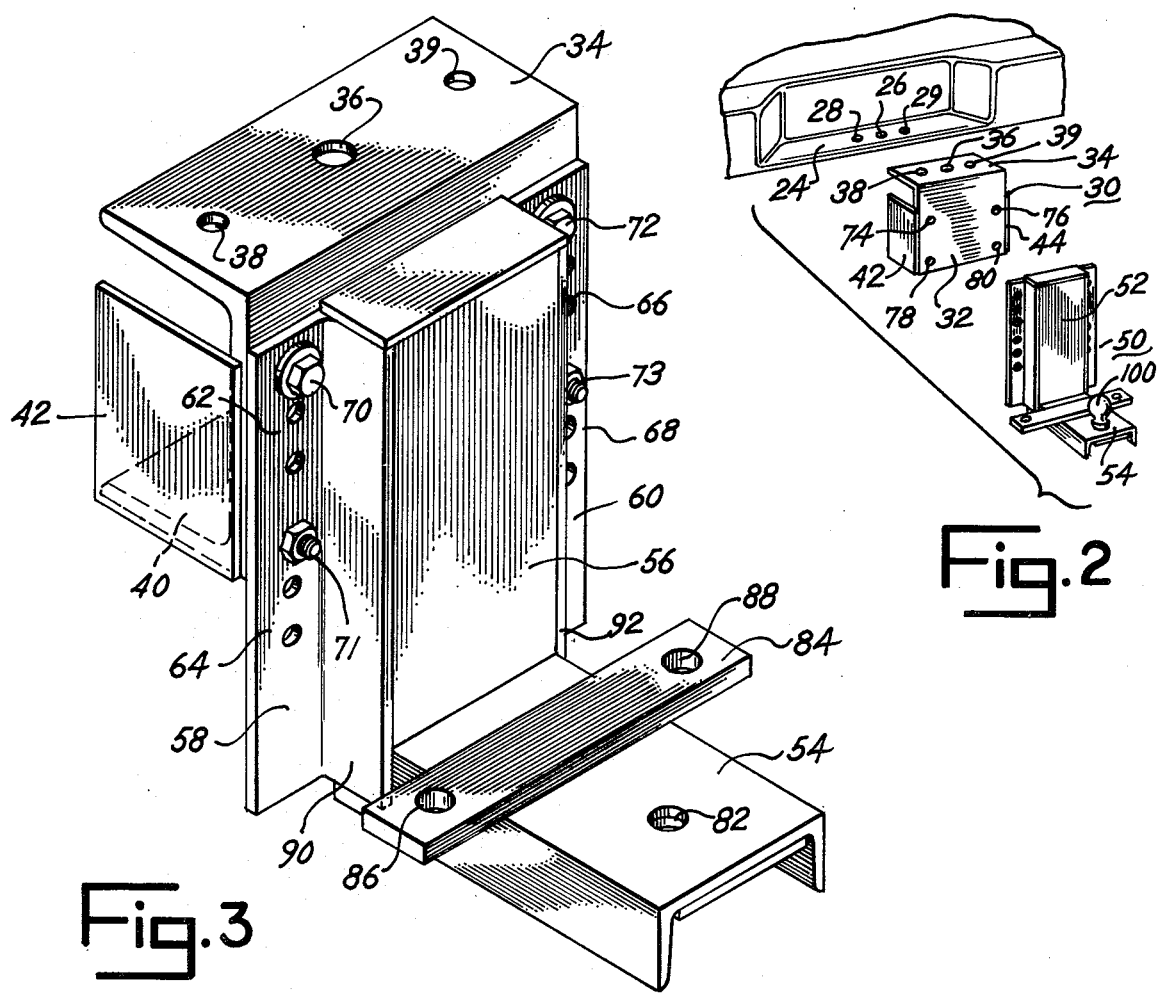

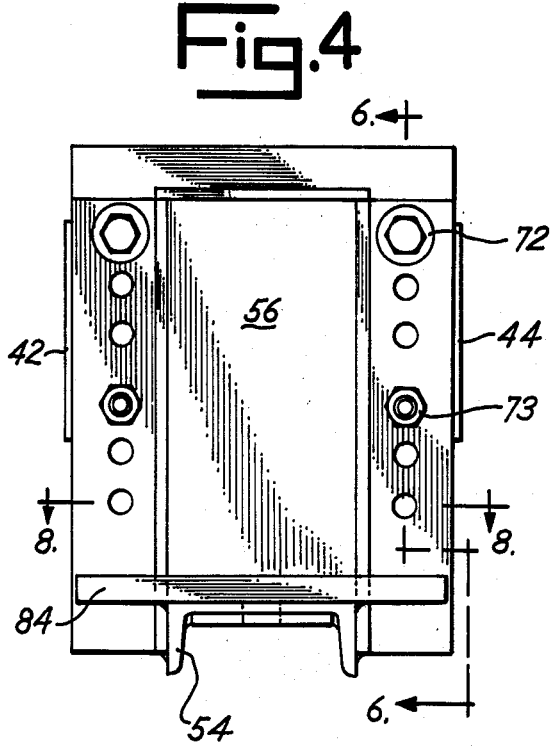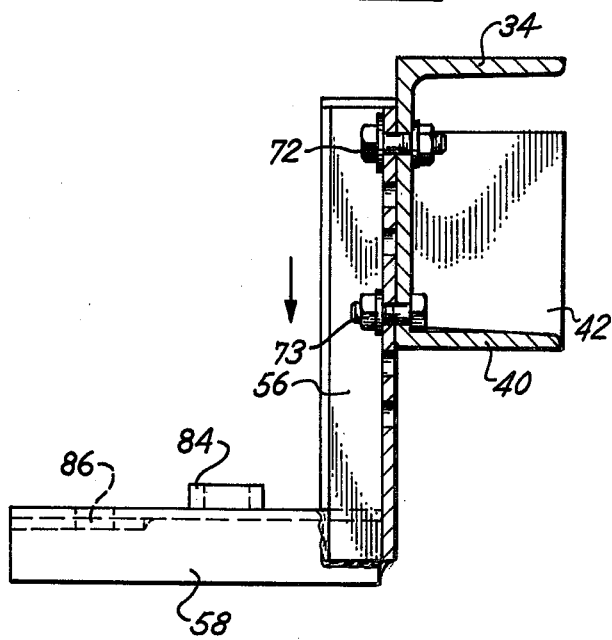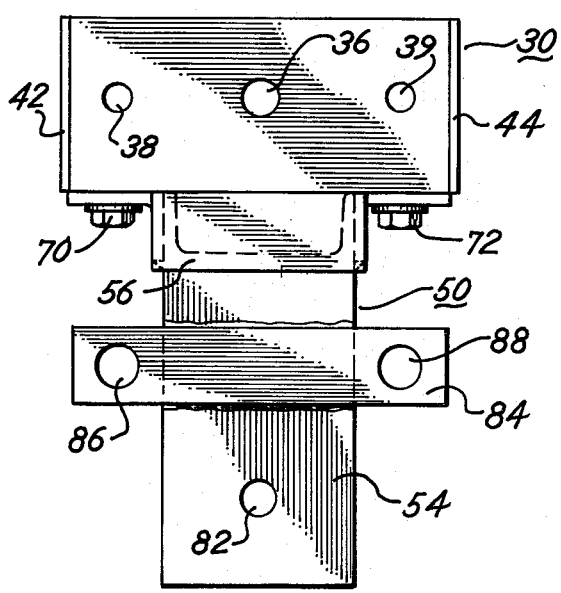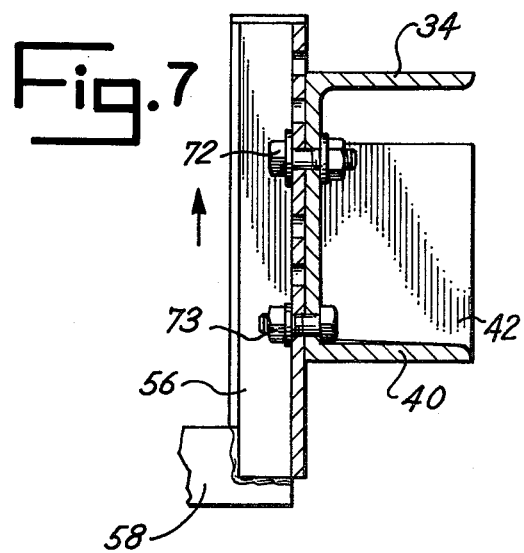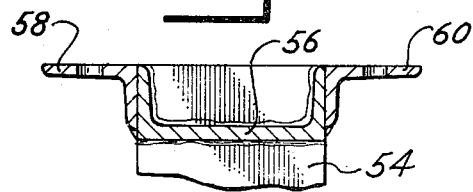

TRAILER HITCH BRACKET

A rear bumper frequently used on pickup trucks contains a recess in the center and a plate or filler at or near the bottom to provide a support for a conventional trailer hitch. The filler plate is provided with a center hole for receiving the stem of the hitch ball, and normally two holes laterally spaced from the center hole for connecting security chains between the truck and trailer. When a trailer is to be connected to the truck, a ball is secured to the plate, and the socket of the hitch which is secured to the trailer is mounted on the ball and pivotally retained thereon. The height of the bumper, and hence the plate, often place the ball at a height where the torque and front end of the trailer are held in an elevated position rather than at a normally level position, and this elevated position may vary as the load in the truck bed is increased and decreased. Since the truck and trailer combinations are often used on long trips, it is desirable to maintain the vehicles on a substantially horizontal line for optimum road handling, riding quality and comfort and appearance. This has often not been possible with the conventional bumper and hitch. It is therefore one of the principal objects of the present invention to provide a bracket for the hitch ball, which can be readily mounted on the bumper plate of a pickup truck where it can easily be connected to the hitch of a trailer, and which can be adjusted to various vertical positions to provide a horizontal line relationship between the truck and trailer. Another object of the invention is to provide a trailer hitch bracket for mounting on the rear bumper of a pickup truck, which can be easily removed from the truck when the trailer is not being towed, and conveniently adjusted from time to time to give the desired alignment between the truck and trailer, and which permits the conventional hitch to be mounted and used in the normal manner, including the use of safety chains to interconnect the two vehicles.

Still another object of the invention is to provide a trailer hitch bracket for use with pickup trucks, which can be adjusted either before or after the trailer is connected thereto, and which can be left on the truck after the trailer has been disconnected therefrom or easily removed and replaced when the trailer is to be towed by the truck.

A further object is to provide a trailer hitch bracket of the aforementioned type which is simple in construction and operation and which can be adapted to different types and makes of pickup trucks without the need for any changes in the basic design and structure of the bracket.

Additional objects and advantages of the present invention will become apparent from the following description and accompanying drawings, wherein:

FIG. 1 is a perspective view of the rear end of a pickup truck showing the present trailer hitch bracket mounted on the rear bumper;

FIG. 2 is an exploded view of the two principal parts of the present trailer hitch bracket and a section of the rear bumper of the pickup truck shown in FIG. 1;

FIG. 3 is a perspective view of the assembled trailer hitch bracket;

FIG. 4 is a rear elevational view of the trailer hitch bracket;

FIG. 5 is a top plan view of the bracket;

FIG. 6 is a vertical cross sectional view of the bracket shown in the preceding figures, the section being taken on line 6—6 of FIG. 4, showing the bracket adjusted to its lowermost position;

FIG. 7 is a vertical cross sectional view similar to that shown in FIG. 6, but showing the bracket adjusted to its uppermost position; and FIG. 8 is a horizontal cross sectional view of the bracket shown in the preceding figures, the section being taken on line 8—8 of FIG. 4;

Referring more specifically to the drawings, and to FIGS. 1 and 2 in particular, numeral 10 indicates generally the rear portion of a pickup truck, including a bed 12, rear wheels 14 and rear bumper 16. The present trailer hitch bracket, indicated generally by the numeral 20, is mounted on the rear bumper at the standard recess 22 on lower horizontal bumper plate 24. The bumper plate is usually formed integrally with the two lateral sides of the bumper, and is sufficiently strong to support the weight of the front end of a trailer such as a camper. The bumper plate normally contains a center hole 26 for a trailer hitch ball and lateral holes 28 and 29 for connecting security chains between the trailer and the pickup truck. The parts which have thus far been described with reference to the pickup truck are conventional and will not be described in greater detail herein.

The bracket 20 consists of a fixture 30 having a vertical plate 32 and a forwardly extending horizontal plate 34 joined integrally to the upper edge of plate 32 and having a center hole 36 and lateral holes 38 and 39 corresponding to holes 26, 28 and 29, respectively. A lower plate 40 and two lateral plates 42 and 44 form reinforcing flanges to provide additional strength to fixture 30. A bolt is inserted downwardly through hole 36 of plate 34 and hole 26 of bumper plate 24, and after a nut has been threaded thereonto, it clamps the fixture rigidly in place on plate 24. The two lateral holes 28 and 29 of bumper plate 24 and holes 38 and 39 of plate 34 may also be used for bolts for additionally securing the fixture 30 rigidly in place on bumper plate 24.

A ball support fixture, indicated generally by numeral 50, has a vertical member 52 and a horizontal member 54 joined to the bottom of said vertical member to form a structure of a generally L-shaped configuration. The vertical member is provided with a center post 56 and lateral flanges 58 and 60. The lateral flange 58 is provided with two sets of holes 62 and 64 of three each, and lateral flange 60 is provided with two sets of holes 66 and 68 of three each, the upper hole sets 62 and 66 being adapted to receive bolts 70 and 72, which extend through one of the three holes into upper holes 74 and 76, and the lower hole sets 64 and 68 being adapted to receive bolts 71 and 73 which extend through one of the holes of the respective set into the lower holes 78 and 80 of fixture 30. The series of holes for each of the bolts 70, 72 and 71 and 73 provide vertical adjustment of fixture 50 with respect to fixture 30, and hence with respect to the ground and the bumper.

The horizontal member 54, which is rigidly connected to vertical member 56, contains a hole 82 which is adapted to receive the threaded stem of the hitch ball. After the stem has been inserted through hole 82, a nut is threaded and tightened onto the stem on the underside of member 54 to hold the ball rigidly in place on member 54. A bar 84 is rigidly secured to member 54 by welding or other securing means, and contains holes 86 and 88 for receiving the end of a pair of chains extending forwardly from the trailer. Both fixtures 30 and 50 are constructed of steel and, when bolted together and adjusted in position, they form a rigid structure which is held firmly to plate 24 of rear bumper 16. Member 54 may be welded to or formed integrally with member 56 and members 58 and 60 may be provided with reinforcing metal strips 90 and 92 to reinforce the connection between the two members 54 and 56 so that the fixture structure will have adequate strength to support the forward end of the trailer and tow the trailer under all road conditions.

In the operation and use of the present trailer hitch bracket, the bracket is mounted on the bumper plate 24 by bolts 94, 96 aand 98 extending downwardly through holes 36, 38 and 39 in plate 34 and through holes 26, 28 and 29 of bumper plate 24. When the bolts are secured in place, the fixture 30 is held rigidly on the bumper. Fixture 50 is moved in a vertical direction to select the elevation desired for hitch ball 100 and is secured in place by bolts 70, 72, 71 and 73 extending through their respective holes in the lateral flanges 58 and 60 and through holes 74, 76, 78 and 80. When the nuts on these bolts have been firmly tightened, the bracket forms a rigid mount for ball 100 with respect to bumper 16. After the ball has been secured in place in hole 82, the socket of the hitch attached to the trailer is placed over the ball and rotatably secured in place thereon. The chains for connecting the truck and trailer are attached to the bracket at holes 86 and 88. If the load, either on the trailer or in the bed of the pickup truck, varies, thereby changing the height of the ball from the ground so that the trailer is not maintained in a substantially level position, the fixture 50 can be adjusted vertically with respect to bracket fixture 30 by removing the four bolts 70, 72, 71 and 73 and selecting new holes to provide the desired elevation of ball 100 and the forward extension of the trailer.

It is seen that the present trailer hitch bracket can readily be installed on the conventional bumper, and provides a versatile mount for the hitch ball so that the optimum position of the trailer can be obtained for most effective roadability and load distribution. This is normally on a horizontal line. Whenever the conditions change such that the angularity of the trailer may change, the hitch bracket can be readily adjusted to compensate for the changing conditions. Further, the hitch bracket can be readily removed when it is not needed for any substantial period of time, and easily replaced when the trailer is to be towed. With some vehicles, fixture 50 may be bolted directly to the bumper, particularly if the bumper is square or has a vertical rear face. Bolts 70, 71, 72 and 73 may extend through holes in the bumper or be replaced by U-bolts. This arrangement eliminates the need for fixture 30 and yet permits vertical adjustment of fixture 50.

While only one embodiment of the present trailer hitch bracket has been described in detail herein, various changes and modifications may be made without departing from the scope of the invention.

I claim:

1. A trailer hitch bracket for mounting on the rear bumper of a pickup truck or other vehicle, comprising a first fixture having a forwardly extending, horizontally positioned plate for seating on and being secured to the bumper and a member rigidly attached to the rear of said plate and extending downwardly therefrom, and a second fixture having a rearwardly extending member having a hole therein for receiving the stem of a hitch ball and a vertically extending member rigidly connected at its lower portion to the forward portion of said rearwardly extending member, a plurality of laterally spaced rearwardly facing holes in said downwardly extending member, a plurality of laterally spaced forwardly facing holes in said vertically extending member for matching with selected holes in said downwardly extending member, and bolts extending through said matching holes to secure said members rigidly together in a vertically adjusted position, said vertically extending member having laterally positioned flanges containing said laterally spaced holes spaced vertically in said flanges.

2. A trailer hitch bracket for mounting on the rear bumper of a pickup truck, as defined in claim 1, in which means is provided on each side of said rearwardly extending member for attaching chains between the trailer and truck.

3. A trailer hitch bracket for mounting on the rear bumper of a pickup truck as defined in claim 2, in which said chain attachment means consists of a transverse bar secured to said rearwardly extending member and a hole in each end of said bar.

* * * * *